(12) United States Patent
Papageorgiou

(10) Patent No.: US 8,315,291 B2
(45) Date of Patent: Nov. 20, 2012

(54) METHOD AND APPARATUS FOR GENERATING SCRAMBLING CODES

(75) Inventor: Andrew James Papageorgiou, Cambridge (GB)

(73) Assignee: Cambridge Silicon Radio Limited, Cambridge, Cambridgeshire (GB)

( * ) Notice: Subject to any disclaimer, the term of this patent is extended or adjusted under 35 U.S.C. 154(b) by 641 days.

(21) Appl. No.: 12/496,789

(22) Filed: Jul. 2, 2009

(65) Prior Publication Data

US 2011/0002363 A1 Jan. 6, 2011

(51) Int. Cl.
*H04B 1/00* (2006.01)

(52) U.S. Cl. ............................................. 375/146

(58) Field of Classification Search ............ 375/130, 375/140, 147, 150, 152, 259, 295, 316, 344, 375/354

See application file for complete search history.

(56) References Cited

U.S. PATENT DOCUMENTS

| | | | | |
|---|---|---|---|---|
| 2002/0181708 A1* | 12/2002 | Seo et al. | | 380/252 |
| 2003/0099357 A1* | 5/2003 | Ryu et al. | | 380/252 |
| 2005/0047527 A1* | 3/2005 | Denk | | 375/316 |
| 2005/0084112 A1* | 4/2005 | Kim et al. | | 380/268 |

OTHER PUBLICATIONS

3GPP TS 21.101 V5.13.0 (Dec. 2007), 3rd Generation Partnership Project; Technical Specification Group Services and Systems Aspects; Technical Specifications and Technical Reports for a UTRAN-based 3GPP System.

3GPP TS 25.211 V5.0.0 (Mar. 2002), 3rd Generation Partnership Project; Technical Specification Group Radio Access Network, "Physical Channels and Mapping of Transport Channels onto Physical Channels".

3GPP TS 25.212 V5.0.0 (Mar. 2002), 3rd Generation Partnership Project; Technical Specification Group Radio Access Network, "Multiplexing and Channel Coding".

3G TS 25.213 V5.0.0 (Mar. 2002), 3rd Generation Partnership Project; Technical Specification Group Radio Access Network; "Spreading and Modulation".

3GPP TS 25.214 V5.0.0 (Mar. 2002), 3rd Generation Partnership Project; Technical Specification Group Radio Access Network; "Physical Layer Procedures".

3GPP TS 25.133 V5.1.0 (Dec. 2001), 3rd Generation Partnership Project; "Requirements for Support of Radio Resource Management".

* cited by examiner

*Primary Examiner* — David C. Payne
*Assistant Examiner* — Syed Haider
(74) *Attorney, Agent, or Firm* — Mark J. Danielson; Pillsbury Winthrop Shaw Pittman LLP

(57) ABSTRACT

Wireless transmission techniques are described, including techniques used to generate scrambling codes for use in wireless transmissions, such as spread spectrum transmissions. In some embodiments, scrambling codes may be iteratively generated using multiplicative factors. The multiplicative factors may be predetermined and stored in advance, reducing processing time when the codes are needed. The multiplicative factor iterations may involve predetermined algorithms, such as squaring and powers of two iterations.

12 Claims, 6 Drawing Sheets

METHOD AND APPARATUS FOR GENERATING SCRAMBLING CODES

TECHNICAL FIELD OF THE INVENTION

This invention relates to a method and apparatus for generating a scrambling code and, in particular, the generation of a scrambling code for use with spread spectrum communications.

BACKGROUND TO THE INVENTION

Code Division Multiple Access (CDMA) is a system whereby spread-spectrum communication is facilitated by modulating different signals according to different codes, transmitting the subsequently modulated signals over the same frequency spectrum, then demodulating the signals at a receiver and separating out the signals. One example of such a CDMA system is the "Third Generation Partnership Project" (3GPP) consortium sponsored wideband-CDMA standard (W-CDMA). The standard is specified by the following documents: 3GPP TS 21.101, 3GPP TS 25.211, 3GPP TS 25.212, 3GPP TS 25.213, 3GPP TS 25.214 and 3G TS 25.133. These documents are incorporated herein by reference.

As specified in the W-CDMA specifications a scrambling code is used to encode the transmitted signal. Therefore, when the encoded signal is received it is necessary for the receiver to allocate the correct code to a signal so that the signal may be descrambled. In the W-CDMA standard, the scrambling code is iteratively defined and is time dependent. Therefore, when the receiver starts up, it is necessary to determine the relative time when the scrambling code was generated and this is then used as a seed to generate the correct code so that the receiver can descramble the transmitted signal.

There are a number of known approaches for producing the correct scrambling code for decoding the received encoded signal at the receiver (also referred to as the downlink scrambling code when the signal is transmitted from a base station to user equipment). For example, it is known to provide a step-wise approach whereby the calculation of the code is iterated the number of required times to produce the required code. However, this is a computationally and time intensive operation.

It is also known to use look-up tables to determine the desired code. However, this is memory intensive.

It is desirable to determine a scrambling code in a manner which achieves a balance between storage requirements and calculation complexity.

SUMMARY OF THE INVENTION

An embodiment of the invention provides for a method of generating a code for use in spread spectrum communication, said code being iteratively defined, said method comprising:

determining, for more than one of said iterations for generating said scrambling code, corresponding multiplicative factors; and combining said multiplicative factors to determine said code.

By generating multiplicative factors which correspond to iterations involved in generating the code, embodiments of the invention allow for the determination of the multiplicative factors for the code is to be generated. Under such circumstances, the generation of the code involves retrieving the pre-calculated multiplicative factors and applying these in a predetermined manner. This is substantially quicker and less resource intensive then having to calculate the code each time it is required.

Said code may be a scrambling code for use with wideband code division multiple access.

Said multiplicative factors may correspond to powers of two iterations.

One or more multiplicative factors may be determined by squaring a multiplicative factor corresponding to a preceding iteration.

Powers of two provide a convenient manner in which to calculate multiplicative factors. In particular, where the determination of a multiplicative factor involves a squaring of a preceding multiplicative factor, arranging these multiplicative factors according to powers of two provides an advantageous arrangement, corresponding to the squaring. Furthermore, this arrangement of the multiplicative factors establishes a balance between operations relating to calculations and operations relating to retrieval from a memory store so that embodiments of the invention provide a more efficient and faster implementation of calculating codes than implementations which rely to a greater extent on one or other of calculation or retrieval operations.

Said squaring may occur in GF(2).

Said spread spectrum communication may comprise wideband code-division multiple access and said multiplicative factors may be generated for each of the powers of two iterations from $2^0$ to $2^{16}$.

The multiplicative factor corresponding to the $2^0$ iteration may correspond to a given input and the multiplicative factors for each of the iterations corresponding to $2^1$ to $2^{16}$ may be generated by squaring a multiplicative factor for the preceding iteration in GF(2).

The method may further comprise the step of determining, for the code to be generated, a required iteration number.

The method may further comprise, for said required iteration number, determining a sum of a set of powers of two, for each of said determined set of powers of two, determining a corresponding multiplicative factor, and applying each of said multiplicative factors to generate said code.

A further embodiment of the invention provides for an apparatus for generating code for use in spread spectrum communication, said code being iteratively defined, said apparatus comprising:

a processor configured to determine, for more than one of said iterations for generating said scrambling code, corresponding multiplicative factors;

said processor being further configured to combine said multiplicative factors to determine said code.

Said code may be a scrambling code for use with wideband code division multiple access.

Said processor may be configured to generate said multiplicative factors corresponding to powers of two iterations.

Said processor may be configured to determine said one or more multiplicative factors by squaring a multiplicative factor corresponding to a preceding iteration.

Said processor may be configured to perform said squaring in GF(2).

Said spread spectrum communication may comprise wideband code-division multiple access and said processor may be configured to generate multiplicative factors for each of the powers of two iterations from $2^0$ to $2^{16}$.

The multiplicative factor corresponding to the $2^0$ iteration may correspond to a given input and the multiplicative factors for each of the iterations corresponding to $2^1$ to $2^{16}$ may be generated by squaring a multiplicative factor for the preceding iteration in GF(2).

Said processor may be further configured to determine, for the code to be generated, a required iteration number.

Said processor may be further configured, for said required iteration number, to determine a sum of a set of powers of two, for each of said determined set of powers of two, determine a corresponding multiplicative factor, and apply each of said multiplicative factors to generate said code.

A further embodiment of the invention provides for an apparatus comprising a processor and a memory store, said processor being configured to determine a plurality of multiplicative factors, said plurality of multiplicative factors having a power relation, said processor being further configured to store said plurality of multiplicative factors in said memory store and retrieve a set of said multiplicative factors from said memory store and apply each of said set of multiplicative factors in a predetermined order to an input to generate a scrambling code for use with spread spectrum communication.

A further embodiment of the invention provides for a computer readable medium comprising a computer program, said program comprising instructions which, when operating on a computer, cause said computer to retrieve a set of multiplicative factors from a memory store and apply each of said set of multiplicative factors in a predetermined order to an input to generate a scrambling code for use with spread spectrum communication, wherein each of said set of multiplicative factors correspond to powers of two iteration, and wherein a sum of all said powers of two of said set of multiplicative factors corresponds to an number of iterations required to generate said scrambling code.

By providing for a multiplicative factor which corresponds to one or more iterations necessary to generate the scrambling code, a balance is achieved between computational and storage requirements. Advantageously, the multiplicative factor corresponding to one or more iterative steps can be provided directly in hardware and, in this case, the computation is restricted to calculating the number of iterations required and combining the desired hard coded multiplicative factors.

Because the multiplicative factor may be stored in a memory store, it is possible to store (or hard code) different multiplicative factors corresponding to different standards (such as W-CDMA) and use the multiplicative factor corresponding to the appropriate standard as required.

Where the method includes the application of more than two iterative steps, it will be realised that the initial steps of the iteration are simpler than the later steps of the iteration. It is therefore advantageous to arrange the multiplicative factors corresponding to the steps into groups, the size of which is dependant upon the complexity of the steps involved. For example, in a system in which memory is addressable in 16-bit words, the implementation may rely on performing the iterative steps as follows: initially six steps may be performed at once; then three steps; then an additional three steps; and lastly, the last four steps. The last group is larger than the second and third groups because it is significantly less likely that all of these steps will be used. It will be realised that the groups may be amended depending on the details of the implementation.

BRIEF DESCRIPTION OF THE DRAWINGS

Embodiments of the invention are hereinafter described with reference to the accompanying drawings in which:

FIGS. 6, 7, 8 and 9 illustrate multiplicative factors for use with embodiments of the invention.

DESCRIPTION OF PREFERRED EMBODIMENTS

Figure 1:
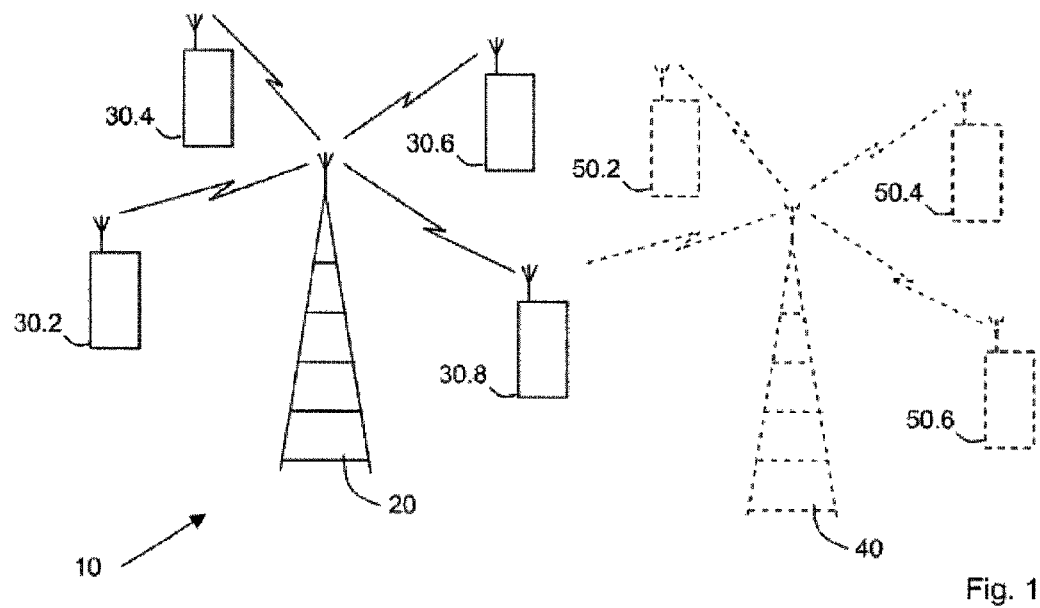
FIG. 1 is a schematic representation of a communication system incorporating aspects of the invention.

FIG. 1 illustrates a communication system which includes a base station 20 and a plurality of user equipments 30.2, 30.4, 30.6 and 30.8. The base station 20 corresponds to a cell of a communications network. Generally, the communications network 10 will consist of a plurality of cells, each with a corresponding base station. An additional base station 40 is illustrated in dotted outline in FIG. 1 with corresponding user equipments 50.2, 50.4 and 50.6. As illustrated, the user equipment 30.8 may communicate with more than one base station.

Figure 2:
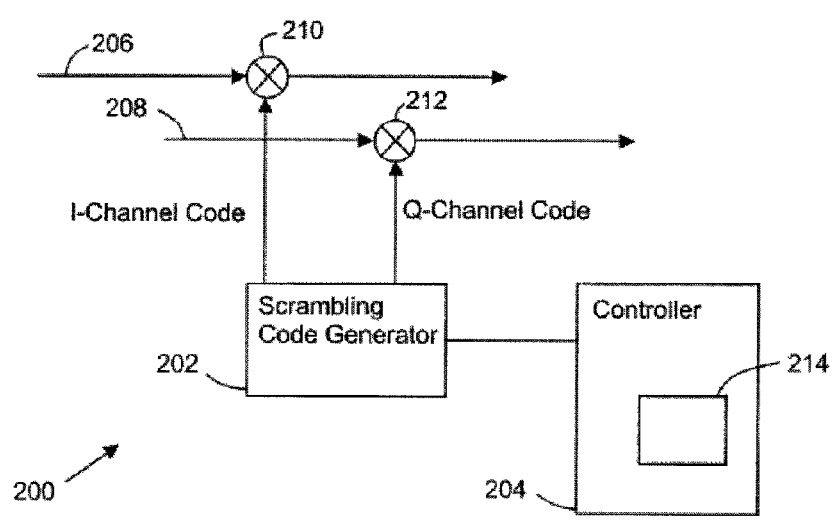
FIG. 2 is a schematic diagram of components of a receiver used in the communication system of FIG. 1.

Each of the base stations and the user equipments in a communications network includes a radio transmitter and receiver. FIG. 2 illustrates components 200 for use in a radio receiver located in a typical user equipment which is operable with the communications network 10 of FIG. 1. Receivers of the type in which the components 200 are operable are well known in the art as rake receivers and the additional details of the receiver will therefore not be further described herein. The receiver components 200 include a scrambling code generator 202 connected to a controller 204. The scrambling code generator 202 is further connected to the incoming I-signal 206 and Q-signal 208. As illustrated, the I-portion of the scrambling code is applied by multiplier 210 to the I-signal 206 and the Q-portion of the scrambling code is applied by multiplier 212 to the Q-signal.

The receiver components 200 operate in the communications system 10 which operates according to the W-CDMA standard. In this standard, a total of $2^{18}-1=262,143$ scrambling codes, numbered 0 . . . 262,142 can be generated. However not all the scrambling codes are used. The scrambling codes are divided into 512 sets, each having a primary scrambling code and 15 secondary scrambling codes.

The primary scrambling codes consist of scrambling codes n=16*i where i=0 . . . 511. The $i^{th}$ set of secondary scrambling codes consists of scrambling codes 16*i+k, where k=1 . . . 15.

There is a one-to-one mapping between each primary scrambling code and 15 secondary scrambling codes in a set such that $i^{th}$ primary scrambling code corresponds to the $i^{th}$ set of secondary scrambling codes.

Hence, according to the above, scrambling codes k=0, 1, . . . , 8,191 are used. Each of these codes are associated with a left alternative scrambling code and a right alternative scrambling code, that may be used for compressed frames. The left alternative scrambling code corresponding to scrambling code k is scrambling code number k+8,192, while the right alternative scrambling code corresponding to scrambling code k is scrambling code number k+16,384.

The scrambling code sequences are constructed by combining two real sequences into a complex sequence. Each of the two real sequences are constructed as the position wise modulo 2 sum of 38400 chip segments of two binary m-sequences generated by means of two generator polynomials of degree 18. The resulting sequences thus constitute segments of a set of Gold sequences. The scrambling codes are repeated for every 10 ms radio frame. Let x and y be the two sequences respectively. The x sequence is constructed using the primitive (over GF(2)) polynomial $1+X^7+X^{18}$. The y sequence is constructed using the polynomial $1+X^5+X^7+X^{10}+X^{18}$.

The sequence depending on the chosen scrambling code number n is denoted $z_n$, in the sequel. Furthermore, let x(i), y(i) and $z_n$(i) denote the $i^{th}$ symbol of the sequence x, y, and $z_n$, respectively.

The m-sequences x and y are constructed as:
Initial conditions:

$$x \text{ is constructed with } x(0)=1, x(1)=x(2)=\ldots=x(16)=x(17)=0 \tag{1}$$

$$y(0)=y(1)=\ldots=y(16)=y(17)=1 \tag{2}$$

Recursive definition of subsequent symbols:

$$x(i+18)=x(i+7)+x(i) \text{ modulo } 2, i=0,\ldots,2^{18}-20 \tag{3}$$

$$y(i+18)=y(i+10)+y(i+7)+y(i+5)+y(i) \text{ modulo } 2, i=0,\ldots,2^{18}-20 \tag{4}$$

The $n^{th}$ Gold code sequence $z_n$, $n=0, 1, 2, \ldots, 2^{18}-2$, is then defined as:

$$z_n(i)=x((i+n) \text{ modulo } (2^{18}-1))+y(i) \text{ modulo } 2, i=0,\ldots,2^{18}-2 \tag{5}$$

These binary sequences are converted to real valued sequences $Z_n$, by the following transformation:

$$Z_n(i) = \begin{cases} +1 & \text{if } z_n(i) = 0 \\ -1 & \text{if } z_n(i) = 1 \end{cases} \text{ for } i = 0, 1, K, 2^{18}-2. \tag{6}$$

Finally, the n:th complex scrambling code sequence $S_{dl,n}$ is defined as:

$$S_{dl,n}(i)=Z_n(i)+jZ_n((i+131072) \text{ modulo } (2^{18}-1)), i=0,1,\ldots,38399 \tag{7}$$

The pattern from phase 0 up to the phase of 38,399 is repeated.

Referring back to FIG. 2, the controller 204 comprises a microprocessor and controls the scrambling code generator 202 to generate scrambling codes as described. The controller 204 includes a memory 214 for storing data such as initial conditions according to which the scrambling code may be generated. Such arrangements are well known in the art and will therefore not be further described herein.

Figure 3:
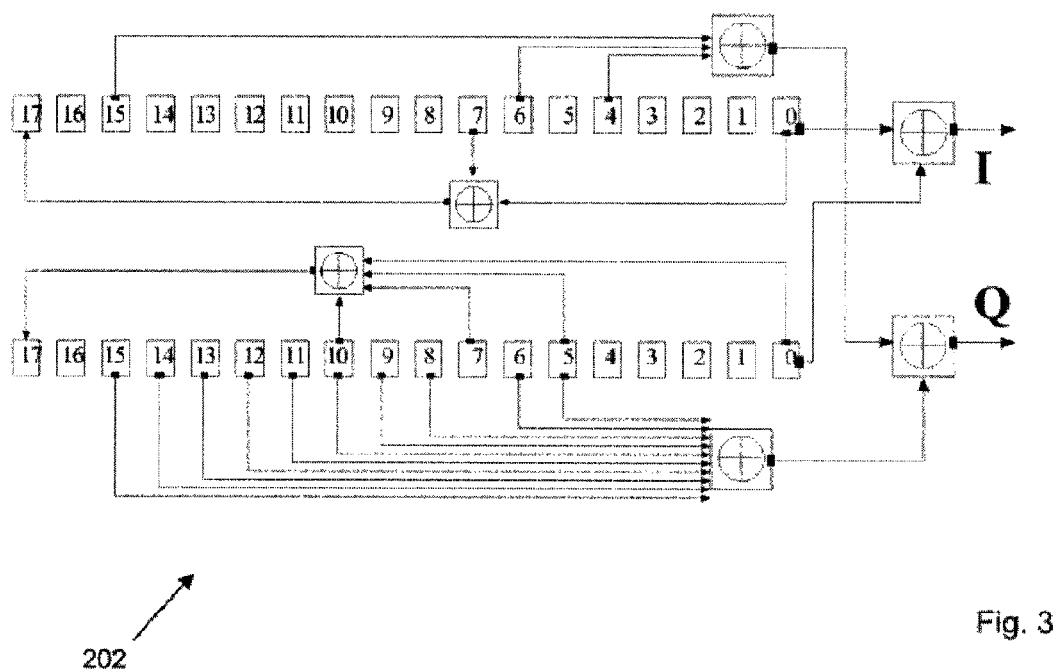
FIG. 3 is a representation of a scrambling code generator.

FIG. 3 illustrates the structure of the scrambling code generator 202 of FIG. 2. The scrambling code generator 202 includes an x-sequence generator and a y-sequence generator. Each of the x- and y-sequences contain parts for generating an I-channel scrambling sequence and Q-channel scrambling sequence. The scrambling code generator 202 generates the required scrambling code in the aforementioned manner. This description of the generation of the scrambling code and the representation of FIG. 3 are taken from the 3GPP TS 25.213 v7.4.0 technical specification.

Referring back to equations (3) and (4) it is to be realised that each of the x sequence and the y sequence may be generated by the application of a mask (or multiplicative factor) and an XOR operation. Therefore the scrambling code for a particular operation may be found if the mask for that iteration can be found and applied to generate an output from which the scrambling code may be generated.

In the following description, the x sequence and equation (3) used to generate these sequences is considered. However, it is to be realised that the same principles are equally applicable to the generation of they sequence. The x sequence used to generate any particular scrambling code is an 18-bit number. Furthermore, 18 bits are required to generate each bit of this number. Therefore the requisite multiplicative factor constitutes an 18 square matrix.

Each iteration will be incorporated by a multiplicative factor. For W-CDMA, an offset of up to 62,976 can exist. $2^{16}=65,536$ and therefore 16 multiplicative factors are required to calculate all of the scrambling codes for W-CDMA.

Figure 4:
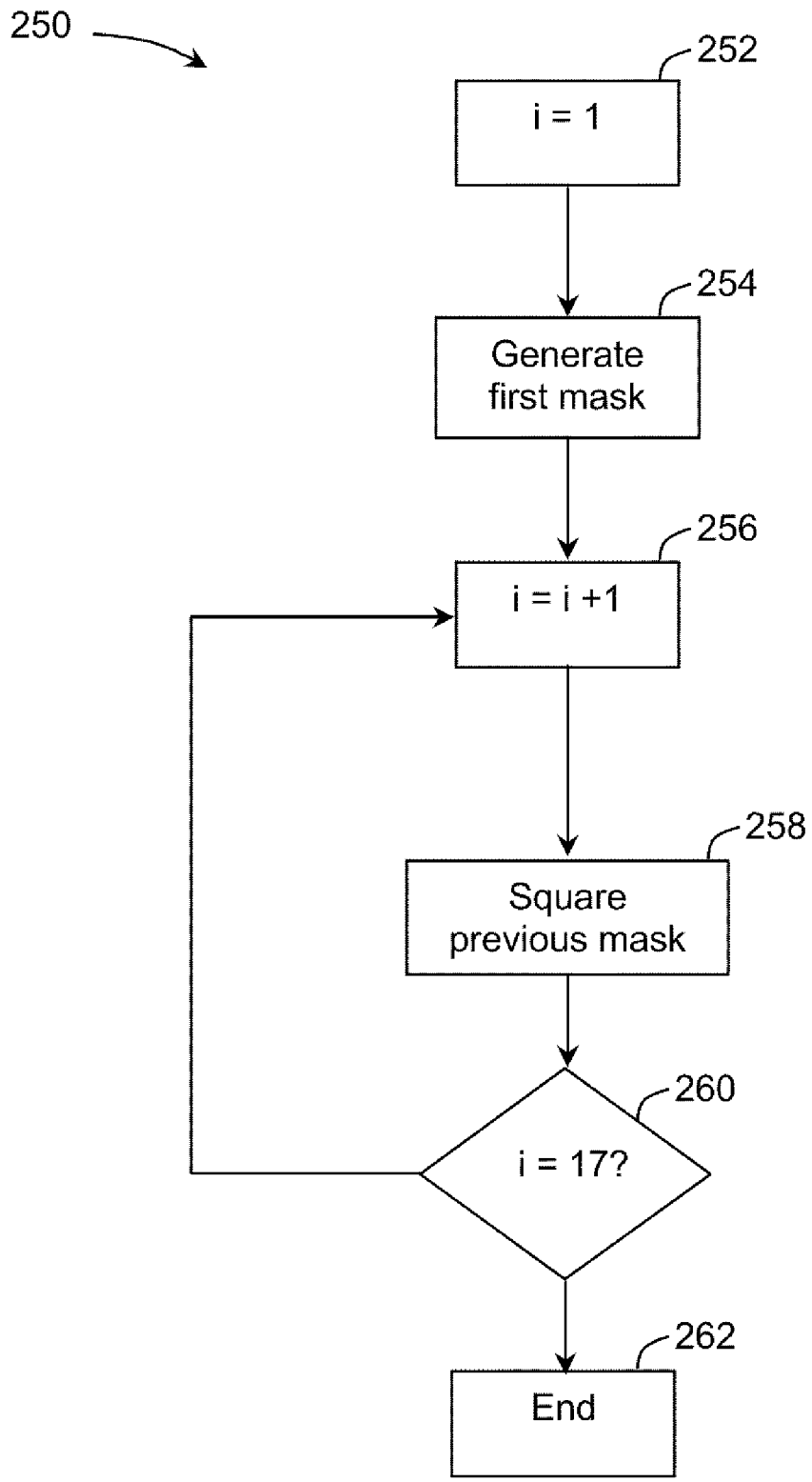
FIG. 4 is a process diagram illustrating a method of generating multiplicative factors according to an embodiment of the invention.

The multiplicative factors are each generated by the application of equation (3) to the starting input defined by equation (1). FIG. 4 illustrates a process 250 for generating the 16 multiplicative factors required to calculate scrambling code sequences for W-CDMA. At step 252 a counter i is set equal to 1. At the following step, step 254, the first multiplicative factor is generated. The first multiplicative factor is derived from equation (3) and, according to this the multiplicative factor for bit 17 is generated by an XOR comparison between the input for bit 0 of the input sequence (equation (1)) and the input for bit 7. In the next step, step 256, the value of the counter i is incremented. In the following step, step 258, the multiplicative factor for the corresponding value of the counter i is calculated. For each of the multiplicative factors corresponding to the second iteration and those following therefrom, the multiplicative factor is generated by squaring the multiplicative factor of the preceding iteration in GF(2).

In step 260 of FIG. 4 an evaluation is made of the counter i and if this value is equal to 17 the process will terminate at step 262. Alternatively, if the value of i is less than 17 the process will return to step 256 where this value will be incremented and the following multiplicative factor will be generated. In a manner multiplicative factors are produced for each of the powers of 2 from 0 (the input of equation (c)) to 16

FIG. 4 therefore illustrates a process for producing multiplicative factors for each of the iterations required to generate the necessary scrambling codes according to the aforementioned equations.

Figure 5:
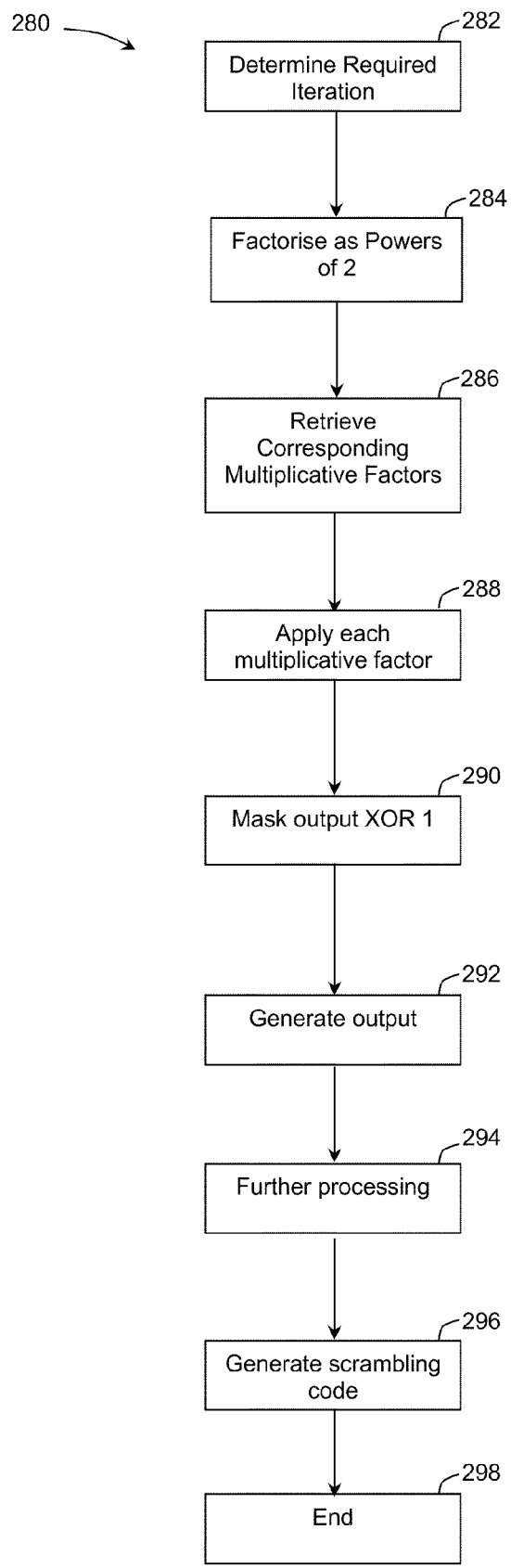
FIG. 5 is a process diagram illustrating a method of retrieving multiplicative factors according to an embodiment of the invention.

FIG. 5 illustrates a process 280 whereby the scrambling code is calculated by use of the multiplicative factor generated according to the process of FIG. 4. The process 280 commences at step 282 where the required iteration is determined. This is often done with reference to timing information to determine which scrambling code is required. Methods for determining the required scrambling code and which iteration of this corresponds to known are and will not be further described herein. In step 284, the iteration concerned is reduced to a sum of powers of 2. In the following step, step 286, the multiplicative factors corresponding to the required powers of 2 are retrieved. The process then proceeds to step 288 where the retrieved multiplicative factors are applied in sequence to the input defined by equation (1), which is done as a mask, and at the following step, step 290, the output of that application is compared with the value 1 by means of an XOR operation. The output of this comparison is then generated in step 292. This output corresponds to the x sequence defined by equation (3). In the following step, step 294, any further processing is performed (this includes the generation of the corresponding y sequence and the calculation of the z sequence as defined by equation (5). In step 296 the output of step 294 is used to calculate the required scrambling code sequence according to equations (7) and (6). Once the scrambling code is being generated the process will terminate at step 296.

If the scrambling code corresponding to the 11,818$^{th}$ iteration is requested, 11,818 is equivalent to: $2^{13}+2^{11}+2^{10}+2^9+2^5+2^3+2^1$. Therefore, the corresponding multiplicative factor for this iteration comprises the multiplicative factors for $2^{13}$, $2^{11}$, $2^{10}$, $2^9$, $2^5$, $2^3$ and 2, which are then applied, in sequence, to the input of equation (c). This output will correspond to the x sequence of the 11, 818$^{th}$ iteration from which the scrambling code may be generated in the manner described.

Figures 6, 7:
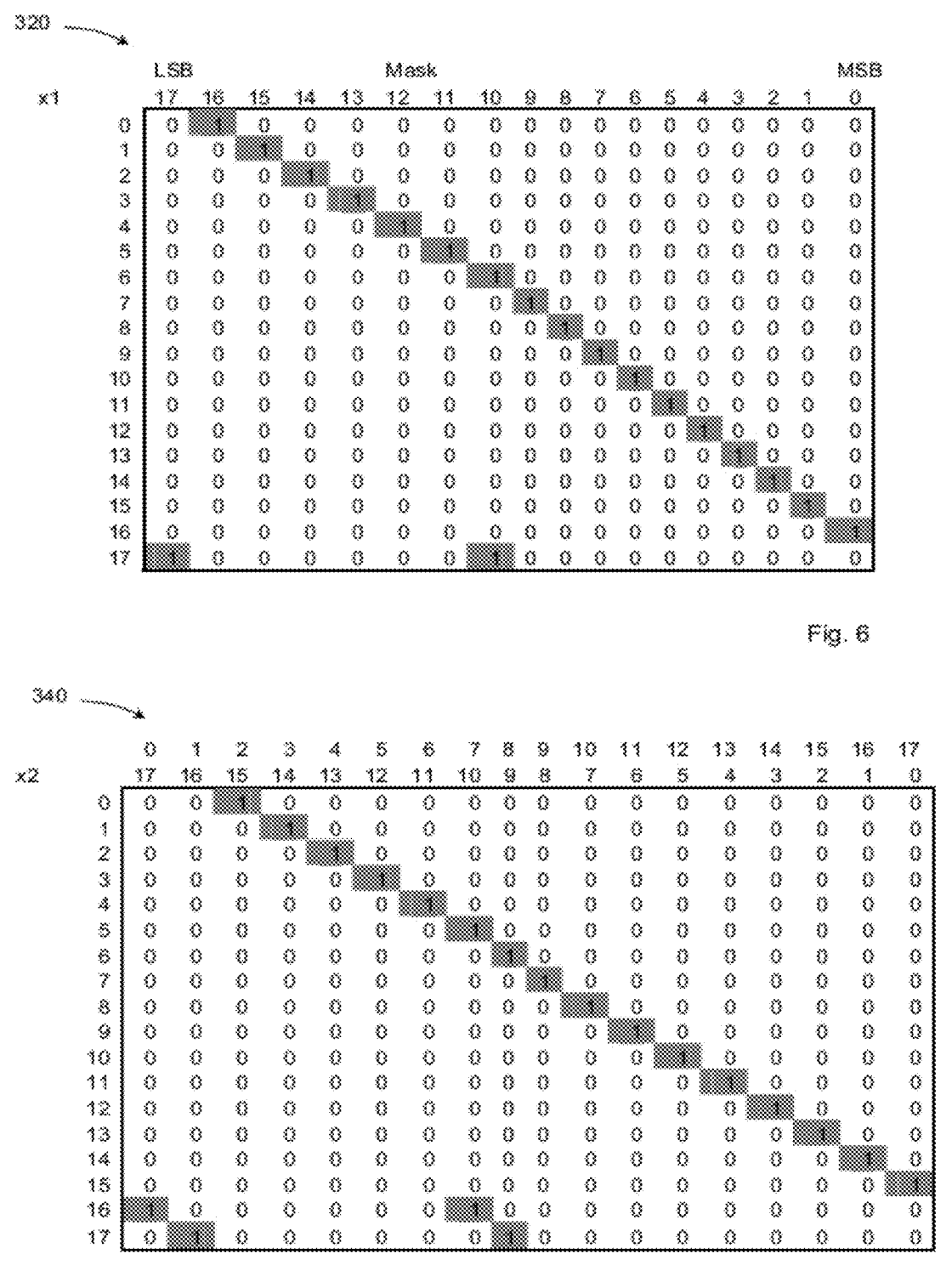

By way of illustration, FIGS. 6, 7, 8 and 9 illustrate masks for various iterations. FIG. 6 illustrates the multiplicative factor 320 for the first iteration. As can be seen from this Figure, the multiplicative factor is generated from equation (3) for the first iteration.

FIG. 7 illustrates the multiplicative factor 340 for the second iteration. This multiplicative factor is a square in GF(2) of the multiplicative factor of FIG. 6.

Figure 8:
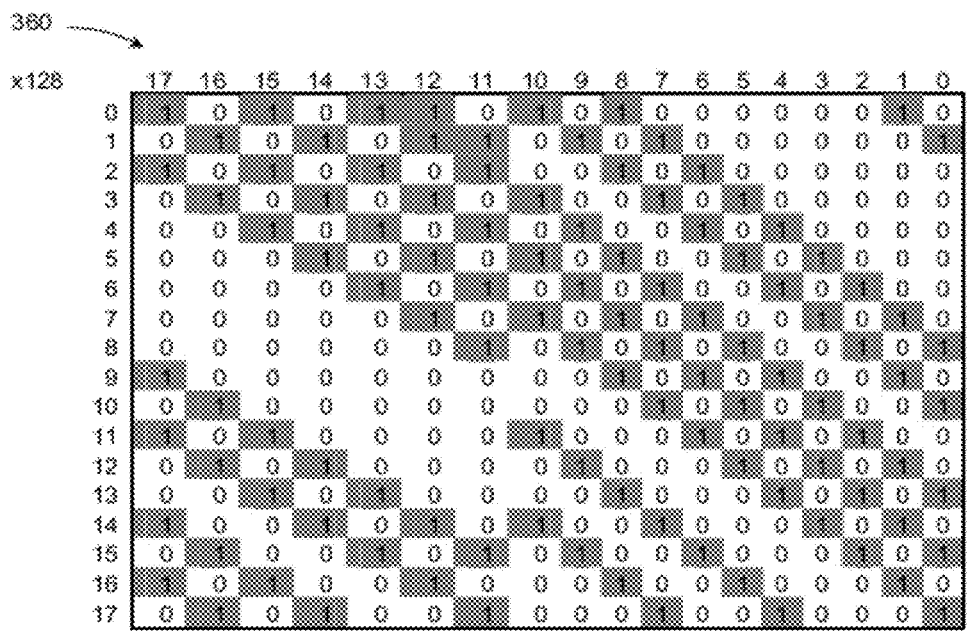
Figure 9:
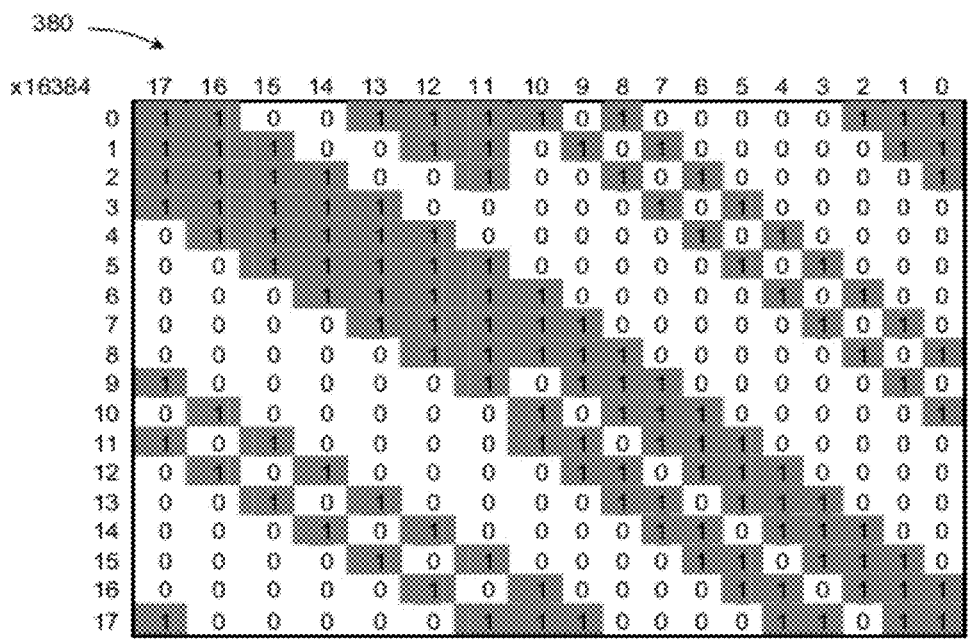

FIG. 8 represents the multiplicative factor 360 for iteration 128 and FIG. 9 illustrates the multiplicative factor 380 for iteration 16,384. It will be realised that the iterations referred to are powers of 2 and that it is not necessary to calculate or retrieve masks for every single iteration.

The foregoing description relates to calculation of scrambling codes for the downlink. However, the described method is equally applicable to the uplink, in which case the multiplicative factors such as those illustrated in FIGS. 6 to 9 are applied in the reverse of the manner described above.

The invention claimed is:

1. A method of generating a scrambling code for use in spread spectrum communication, said scrambling code being iteratively defined, said method comprising:
   determining, for more than one of said iterations for generating said scrambling code, corresponding multiplicative factors; and
   combining said multiplicative factors to determine said scrambling code; wherein
   said multiplicative factors correspond to powers of x iterations;
   one or more multiplicative factors are determined by squaring a multiplicative factor corresponding to a preceding iteration; and
   the multiplicative factor corresponding to the x$^0$ iteration corresponds to a given input and the multiplicative factors for each of the iterations corresponding to x$^1$ to x$^y$ are generated by squaring a multiplicative factor for the preceding iteration in GF(2), where y is a total number of multiplicative factors required to calculate all scrambling codes.

2. The method according to claim 1 wherein said scrambling code is a scrambling code for use with wideband code division multiple access.

3. The method according to claim 1 wherein said squaring occurs in GF(2).

4. The method according to claim 1 wherein said spread spectrum communication comprises wideband code-division multiple access and wherein multiplicative factors are generated for each of the powers of two iterations from 2$^0$ to 2$^{16}$.

5. The method according to claim 1 further comprising the step of determining, for the scrambling code to be generated, a required iteration number.

6. The method according to claim 5 further comprising, for said required iteration number, determining a sum of a set of powers of two, for each of said determined set of powers of two, determining a corresponding multiplicative factor, and applying each of said multiplicative factors to generate said scrambling code.

7. Apparatus for generating scrambling code for use in spread spectrum communication, said scrambling code being iteratively defined, said apparatus comprising:
   a processor configured to determine, for more than one of said iterations for generating said scrambling code, corresponding multiplicative factors;
   said processor being further configured to combine said multiplicative factors to determine said scrambling code; wherein
   said processor is configured to generate said multiplicative factors corresponding to powers of x iterations;
   said processor is configured to determine said one or more multiplicative factors by squaring a multiplicative factor corresponding to a preceding iteration; and
   the multiplicative factor corresponding to the x$^0$ iteration corresponds to a given input and the multiplicative factors for each of the iterations corresponding to x$^1$ to x$^y$ are generated by squaring a multiplicative factor for the preceding iteration in GF(2), where y is a total number of multiplicative factors required to calculate all scrambling codes.

8. The apparatus according to claim 7 wherein said scrambling code is a scrambling code for use with wideband code division multiple access.

9. The apparatus according to claim 7 wherein said processor is configured to perform said squaring in GF(2).

10. The apparatus according to claim 7 wherein said spread spectrum communication comprises wideband code-division multiple access and wherein said processor is configured to generate multiplicative factors for each of the powers of two iterations from 2$^0$ to 2$^{16}$.

11. The apparatus according to claim 7 wherein said processor is further configured to determine, for scrambling the code to be generated, a required iteration number.

12. The apparatus according to claim 11 wherein said processor is further configured, for said required iteration number, to determine a sum of a set of powers of two, for each of said determined set of powers of two, determine a corresponding multiplicative factor, and apply each of said multiplicative factors to generate said scrambling code.

* * * * *

UNITED STATES PATENT AND TRADEMARK OFFICE
CERTIFICATE OF CORRECTION

PATENT NO. : 8,315,291 B2
APPLICATION NO. : 12/496789
DATED : November 20, 2012
INVENTOR(S) : Papageorgiou Page 1 of 1

It is certified that error appears in the above-identified patent and that said Letters Patent is hereby corrected as shown below:

In the Specification:

In Column 5, Line 66, delete "they" and insert -- the y --, therefor.

In the Claims:

In Column 8, Line 10, in Claim 7, delete "Apparatus" and insert -- An apparatus --, therefor.

Signed and Sealed this
Fifth Day of February, 2013

Teresa Stanek Rea
*Acting Director of the United States Patent and Trademark Office*